(12) United States Patent
Nagasawa

(10) Patent No.: US 7,535,196 B2
(45) Date of Patent: May 19, 2009

(54) POWER APPARATUS AND ELECTRONIC EQUIPMENT FOR CELLULAR PHONE HAVING MAIN BATTERY AND ATTACHABLE BATTERY

(75) Inventor: Makoto Nagasawa, Tokyo (JP)

(73) Assignee: NEC Corporation, Tokyo (JP)

(*) Notice: Subject to any disclaimer, the term of this patent is extended or adjusted under 35 U.S.C. 154(b) by 889 days.

(21) Appl. No.: 11/034,844

(22) Filed: Jan. 14, 2005

(65) Prior Publication Data

US 2005/0162132 A1 Jul. 28, 2005

(30) Foreign Application Priority Data

Jan. 22, 2004 (JP) ............... 2004-013886

(51) Int. Cl.
*H02J 7/00* (2006.01)
(52) U.S. Cl. .............. 320/114; 320/106; 320/107; 320/111; 320/112; 320/113; 320/115
(58) Field of Classification Search ............. 320/107, 320/111, 113, 115, 106, 108, 112, 114
See application file for complete search history.

(56) References Cited

U.S. PATENT DOCUMENTS

| | | | | |
|---|---|---|---|---|
| 5,659,236 | A | * | 8/1997 | Hahn .................. 320/111 |
| 5,684,384 | A | | 11/1997 | Barkat et al. |
| 6,014,010 | A | * | 1/2000 | Yao .................. 320/110 |
| 6,043,626 | A | * | 3/2000 | Snyder et al. .......... 320/113 |
| 6,049,192 | A | * | 4/2000 | Kfoury et al. .......... 320/113 |
| 6,054,839 | A | * | 4/2000 | Guimier et al. ......... 320/113 |
| 6,081,096 | A | | 6/2000 | Barkat et al. |
| 6,118,250 | A | | 9/2000 | Hutchison, IV et al. |
| 6,167,289 | A | | 12/2000 | Ball et al. |
| 6,184,654 | B1 | * | 2/2001 | Bachner et al. ......... 320/114 |
| 6,356,054 | B1 | * | 3/2002 | Herrmann ............. 320/115 |
| 6,701,394 | B2 | * | 3/2004 | Wang .................. 710/62 |

FOREIGN PATENT DOCUMENTS

| | | |
|---|---|---|
| CN | 1246737 A | 3/2000 |
| CN | 1316125 A | 10/2001 |
| JP | 10-143290 | 5/1998 |
| JP | 2000-165514 A | 6/2000 |
| JP | 2002-504800 A | 2/2002 |
| JP | 2002-504800 A | 2/2002 |
| JP | 2002-101568 A | 4/2002 |
| JP | 2002-520989 A | 7/2002 |

* cited by examiner

*Primary Examiner*—Akm E Ullah
*Assistant Examiner*—Arun Williams
(74) *Attorney, Agent, or Firm*—Foley & Lardner LLP

(57) ABSTRACT

A lock key is unlocked in a state where a cellular phone is processing a call and using an external battery as the power supply. A "HIGH" signal is inputted to a connection detection circuit before the power supply from the external battery stops. A control circuit determines, based on the voltage detected by the connection detection circuit, that a battery unit in which the external battery is disposed and the main body of the cellular phone are in a detaching-state, and switches the power supply from the external battery to a built-in battery of the cellular phone via a battery change-over circuit. In other words, because the switching process of the power supply takes place in the above-mentioned detaching-state after unlocking the lock key, the power supply to the cellular phone is not interrupted, and the power-on state is kept, and the call, etc. are continued.

20 Claims, 6 Drawing Sheets

POWER APPARATUS AND ELECTRONIC EQUIPMENT FOR CELLULAR PHONE HAVING MAIN BATTERY AND ATTACHABLE BATTERY

BACKGROUND OF THE INVENTION

1. Field of the Invention

The present invention relates to a power apparatus which attaches or detaches a battery unit to or from the main body of a cellular phone and an electronic equipment using a power apparatus. Specifically, the present invention relates to a power apparatus which supplies electric power by switching, for example, a second battery connected externally to a cellular phone and a first battery disposed inside the main body of the cellular phone, and an electronic equipment using a power apparatus.

2. Description of the Related Art

Since portable electronic equipments such as cellular phones use batteries as the power apparatus, the cellular phones become unusable when the remaining battery level runs out. Therefore, some types of cellular phones have been proposed, wherein a plurality of batteries are provided and the battery voltage is monitored so as to give out an alarm (warning message) when the remaining battery level is running low (see Patent Literature 1 that is Japanese Patent Laid-Open No. 2000-165514).

A user who noticed the above-mentioned warning message, for example, had to stop using the cellular phone and change or charge the battery. In addition, other types of cellular phones have been proposed, wherein a built-in battery and an external battery are provided so as to switch between each other when either of the remaining battery level runs out, thereby keeping the cellular phone operating (see Patent Literature 2 that is Japanese Patent Laid-Open No. 2002-504800).

Electronic equipments such as cellular phones are equipped with functionalities other than a telephone, including a digital camera, a radio, a television, etc. In addition, recent cellular phones are equipped with a high-resolution display device for obtaining high-quality images, or a substitute display device or a flash for use with a camera. Enhancement of the above-mentioned cellular phone functionalities increases power consumption.

At the same time, considering the portability of cellular phones, the external size of cellular phones is required to be smaller and slimmer, which in turn requires batteries with a reduced volume. There is, thus, an increasing need for a smaller power apparatus which keeps the cellular phone operating over a long time period.

Now, in the Patent Literatures 1 and 2, batteries serving as the power apparatus are switched by monitoring (detecting) the voltage of the backup battery (internal battery) and the battery pack (external battery), respectively. However, power supply from the battery pack to the control circuit (battery switching circuit) stops when the battery pack is suddenly detached from the cellular phone during the use of the battery pack. Calls are thus forcibly terminated because the power apparatus of the cellular phone turns off before the power apparatus switches from the battery pack to the backup battery.

Here the Patent Literature 2 describes that software is designed to switch to the internal battery when the external battery is detached (see Paragraph "0027" of the Patent Literature 2). However, the patent literature 2 lacks disclosure of a concrete arrangement for switching from the external battery to the internal battery when the external battery is detached, hence preventing implementation as a product. In other words, the above-mentioned software design alone may not practically avoid turning off the power before switching from the external battery to the internal battery, when the external battery is detached.

SUMMARY OF THE INVENTION

It is an object of the present invention to provide a power apparatus and an electronic equipment which can supply power even when an outside battery is detached from the main body of the electronic equipment. It is also an object of the present invention to provide a compact power apparatus and an electronic equipment which can keep the electronic equipment operating over a long time period.

A power apparatus of the present invention comprises a first-battery disposed in the main body of an electronic equipment; a battery unit detachably disposed in the main body, a second battery disposed in the battery unit; first detecting means for detecting, before the power supply of the electronic equipment turns off, a detaching-state prior to complete detachment of the battery unit from the main body; and control means for switch-controlling, when the first detecting means detects the detaching-state in the battery unit and the main body, the power supply of the electronic equipment from the second battery to the first battery.

In addition, the electronic equipment of the present invention comprises a first battery which is a chargeable battery; a main body for disposing said first battery; a battery unit detachably disposed for said main body; a second battery disposed in said battery unit; first detecting means for detecting, before the power supply of said electronic equipment turns off, a detaching-state prior to complete detachment of said battery unit from said main body; and control means for switch-controlling, when said first detecting means detects said detaching-state in said battery unit and said main body, the power supply of said electronic equipment from said second battery to said first battery.

When the first detecting means detects the detaching-state of the battery unit from the main body of the electronic equipment, the control means switches the power supply of the electronic equipment from the second battery to the first battery, before the power supply of electronic equipment turns off.

In other words, when a detaching operation of the battery unit from the main body, such as unlocking a locking means locking the battery unit, is performed, the control means switches the power supply to the first battery before the power supply from the second battery stops. Thus, power to the electronic equipment is kept on, because the power supply is not interrupted, and the calls are continued.

In the present invention, since the second and the third detecting means detect the voltages of the first battery and the second battery respectively, a determining means switches, during the use of the electronic equipment, the battery for use as the power supply based on the results of detection according to the above-mentioned battery voltages. Therefore, the electronic equipment remains usable over a long time period, because both batteries can be used up until the remaining battery level runs out. In addition, as the second battery, a small capacity battery, i.e. that having a smaller volume is available, therefore, miniaturization or slimming of electronic equipments can be realized, and also enhancing design flexibility in terms of appearance can be performed.

DESCRIPTION OF THE PREFERRED EMBODIMENTS

A power apparatus and an electronic equipment such as a cellular phone, composing an embodiment of the present invention, will be described based on FIGS. 1 and 2, as follows.

(General Arrangement with Regard to the Power Line of a Cellular Phone)

Figure 1:
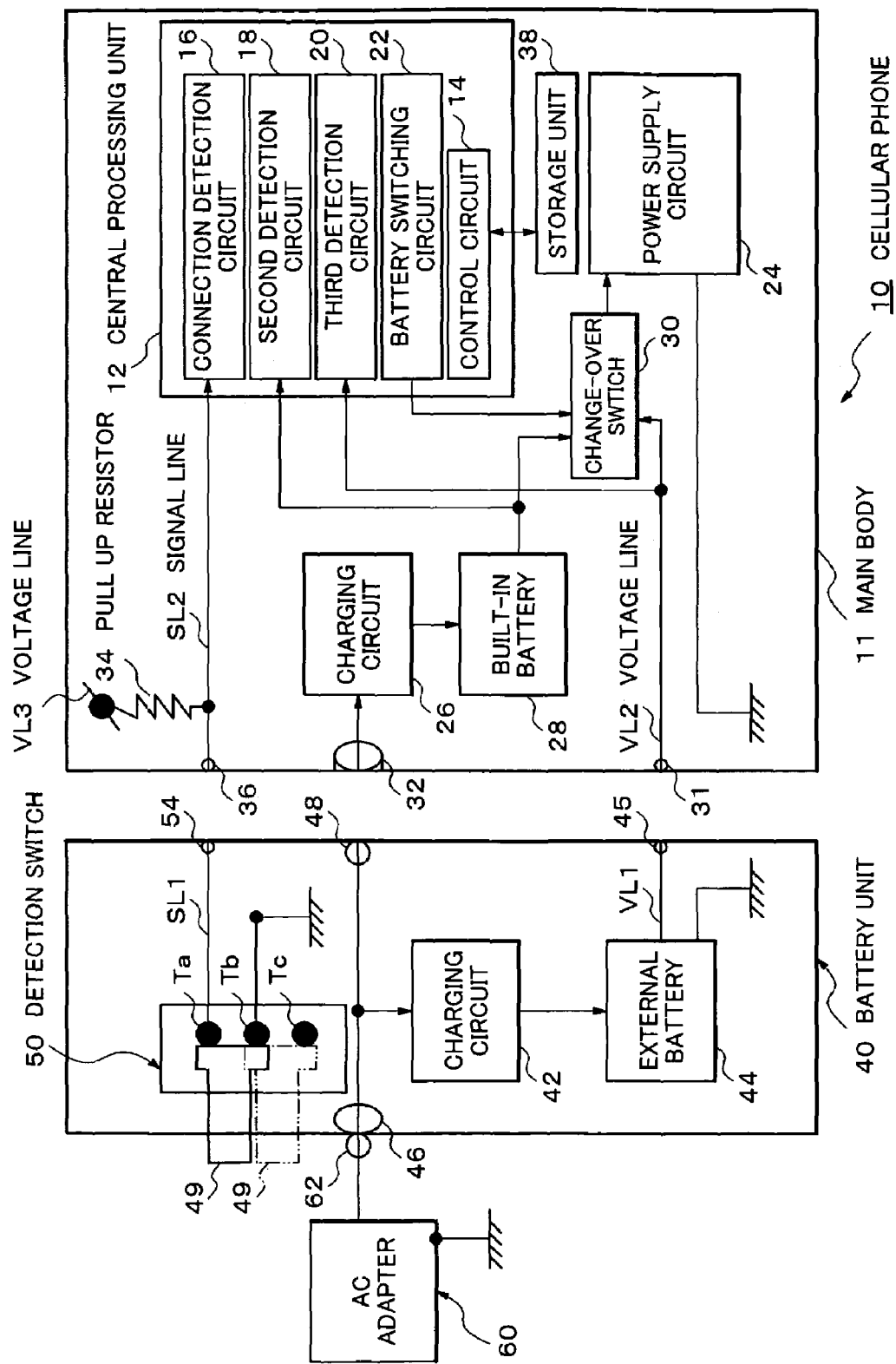
FIG. 1 is a block diagram of a power apparatus according to one embodiment of the present invention.

Referring to FIG. 1, an arrangement of the power line with regard to a cellular phone is described. A main body (housing) 11 of a cellular phone 10 and a battery unit 40 are arranged in a detachable coupling (connection). For example, the battery unit 40 can be attached to or detached from the main body 11 by sliding the battery unit 40 relative to the main body 11. Here, the cellular phone 10 comprises a central processing unit (CPU) 12, a power supply circuit 24, a first charging circuit 26, a built-in battery 28 that is a first battery, a change-over switch 30 and a connecting terminal 32.

On the other hand, the battery unit 40 and an AC adapter 60 are arranged to be connectable. Here, since the AC adapter 60 is a commercially available common product, its detailed description is omitted.

(Arrangement of the Battery Unit)

The battery unit 40 comprises a second charging circuit 42, an external battery 44 that is a second battery, connecting terminals 46 and 48, and a detection switch 50. Here, the connecting terminal 46 is a first connecting means, and the connecting terminal 48 is a second connecting means.

The connecting terminal 46 has a structure connectable with a terminal 62 of the AC adapter 60. The connecting terminal 46 is an input terminal which inputs (supplies) charging power from the AC adapter 60 to the battery unit 40. On the other hand, the connecting terminal 48 is an output terminal for supplying the charging power from the AC adapter 60 to the cellular phone 10 via the battery unit 40. And the connecting terminal 48 is arranged to be connectable to the terminal 32 of the cellular phone 10.

The second charging circuit 42 is a circuit for controlling the charging voltage or the charging current of the external battery 44. The second charging circuit 42 is connected between the connecting terminal 46 and the external battery 44. The external battery 44, which is a chargeable secondary battery, is charged by the charging power from the AC adapter 60. In addition, the second charging circuit 42 alone processes the charge control, without the necessity of control by the central processing unit 12 of the cellular phone 10. Thus, charging the external battery 44 will be performed even if the battery unit 40 is not connected to the cellular phone 10, provided that the AC adapter 60 is connected to the battery unit 40.

(Arrangement of the Cellular Phone)

As mentioned above, the cellular phone 10 comprises the central processing unit 12, the power supply circuit 24, the first charging circuit 26, the built-in battery 28, the change-over switch 30, and the connecting terminal 32. The first charging circuit 26, is connected between the connecting terminal 32 and the built-in battery 28, outputs (supplies) the charging power from the AC adapter 60 to the built-in battery 28. In other words, the built-in battery 28 is a chargeable secondary battery, and charging power from the AC adapter 60 is supplied to the built-in battery 28 via the first charging circuit 26.

The connecting terminal 32, as well as which is connectable to the output terminal of the AC adapter 60, is connectable to the connecting terminal 48 of the battery unit 40 as stated above. In other words, the charging power from the AC adapter 60 is supplied to the built-in battery 28 via the connecting terminal 32 and the first charging circuit 26. In addition, the connecting terminal 62 of the AC adapter 60 has a structure which can be connected to both the connecting terminal 46 of the battery unit 40 and the connecting terminal 32 of the main body 11.

The central processing unit 12 comprises a control circuit 14, a connection detection circuit (a first detection circuit) 16, a second detection circuit 18, a third detection circuit 20, a battery switching circuit 22. The connection detection circuit 16 is a circuit for detecting the attach/detach status of the battery unit 40 relative to the main body 11 of the cellular phone 10. The second detection circuit 18, which is a detection circuit for detecting the voltage of the built-in battery 28, constitutes a second detecting means. The third detection circuit 20, which is a detection circuit for detecting the voltage of the external battery 44 carried in the battery unit 40, constitutes a third detecting means.

The change-over switch 30 is connected between the output terminals of the built-in battery 28 and the external battery 44, and the power supply circuit 24. The change-over switch 30, to which the battery switching circuit 22 of the central processing unit 12 is connected, switches the built-in battery 28 and the external battery 44 as the power supply. In addition, voltage lines VL1 and VL2 are connected to the external battery 44 and the change-over switch 30. Here, as shown in FIG. 2, the voltage lines VL1 and VL2 are coupled, by connecting the battery unit 40 to the main body 11, via the connecting terminals 45 and 31. Therefore, electric power from the external battery 44 is supplied, via the change-over switch 30, to the power supply circuit 24.

Here, when the battery unit 40 is not connected to the main body 11 of the cellular phone 10, the built-in battery 28 supplies power to the power supply circuit 24, etc. When the battery unit 40 is connected to the main body 11, either one of the external battery 44 or the built-in battery 28 supplies power to the power supply circuit 24, etc. Furthermore, the built-in battery 28 gets ready to be charged by connecting the AC adapter 60 to the connecting terminal 32 of the cellular phone 10. In addition, the built-in battery 28 gets ready to be charged by connecting the battery unit 40, having the AC adapter 60 connected thereto, to the main body 11.

As shown in FIG. 1, the control circuit 14 of the central processing unit 12, which is in charge of the overall operation of the cellular phone 10, controls the battery switching circuit 22 based on detection results of, for example, the second detection circuit 18 and the third detection circuit 20. In other words, when the third detection circuit 20 detects that the voltage of the external battery 44 is equal to a threshold value or less, the control circuit 14 performs such processes as switching the change-over switch 30 by controlling the battery switching circuit 22.

The control circuit 14 has a storage unit 38 connected thereto. The storage unit 38 has a program for performing various processes, and a storage area (including work area) for reading or writing various data. Data from the control circuit 14 (data such as detection results of the detection circuits 16, 18, and 20) are then stored in the storage unit 38. On the other hand, the data stored in the storage unit 38 are outputted to the control circuit 14.

The power supply circuit 24 is connected to the central processing unit 12 etc., and wired to each component of the central processing unit 12, etc. so that electric power can be supplied. Here, in FIG. 1, illustration of wiring of the power supply circuit 24 is omitted. This is for protecting confusion when connecting a plurality of wiring to each circuit.

In addition, the cellular phone 10 comprises a radio circuit, input devices, such as a power supplying key and a numeric keypad, etc. a display, a microphone, a speaker, which are not shown. Then, the cellular phone 10 transmits and/or receives signals via the radio circuit.

(Connection Detection Arrangement in the Battery Unit)

The battery unit 40 and the main body 11 of the cellular phone 10 have a lock mechanism disposed thereon for locking the battery unit 40 to the main body 11. The lock mechanism comprises a lock key 49, which is disposed on the battery unit 40 in a state that the lock key can be slid, and a groove (not shown) for latching a nail (not-shown), of the lock key 49. Here, the lock mechanism is a mechanism which prevents the battery unit 40 from coming off the main body 11, when a load (shock) is applied to the cellular phone 10, etc.

The groove is formed on a portion of the main body 11 corresponding to the nail of the lock key 49. Then, the battery unit 40 is locked to the main body 11 by latching the lock key 49 to the groove of the main body 11. Here, the lock mechanism has an arrangement in which the lock key 49, upon attachment of the battery unit 40 to the main body 11, latches the groove (not shown), and the above-mentioned latching, is released by sliding the lock key 49 when detaching the battery unit 40.

In addition, the lock key 49 slides between the solid line and the chain double-dashed line of FIG. 1 relative to terminals Ta to Tc of the detection switch 50. In a state where the lock key 49 is resting at a location expressed by the solid line (an open circuit state wherein the detection switch 50 is on), the lock key 49 is connected to the terminals Ta and Tb. The terminal Ta is connected to the connection detection circuit 16 of the central processing unit 12. The terminal Tb is grounded.

The terminal Ta and the connection detection circuit 16 are connected to signal lines SL1 and SL2. Then, as shown in FIG. 2, the signal lines SL1 and SL2 are connected via terminals 54 and 36 by locking the battery unit 40 to the main body 11. Thus the terminal Ta and the connection detection circuit 16 are connected via the signal lines SL1 and SL2.

On the other hand, the lock key 49 is connected to the terminals Tb and Tc in a state where the lock key 49 is resting at a position of the chain double-dashed line (a closed circuit state wherein the detection switch 50 is off). Here, although the detection switch 50 of the present embodiment is an example of a three-contact type, those types such as a two-contact type is similarly applicable. In addition, a pull up resistor 34 is connected between the signal line SL2 and the voltage line VL3 of the power supply circuit 24. The pull up resistor 34 generates and also stabilizes the output voltage of the detection switch 50 when it is ON or OFF ("HIGH" signal and "LOW" signal) In a state where the battery unit 40 is not connected to the main body 11 of the cellular phone 10, the connection detection circuit 16 detects a "HIGH" signal, because the voltage of the voltage line VL3 is applied to the connection detection circuit 16 via the pull up resistor 34. Here, the connection detection circuit 16 detects the "HIGH" signal also when the detection switch 50 is off (in FIG. 1, the state shown in the chain double-dashed line) because the lock key 49 is connected to the terminals Tb and Tc.

On the contrary, in a state where the battery unit 40 is connected to the main body 11 of the cellular phone 10, in other words, the detection switch 50 is ON (in FIG. 1, the state shown in the solid line), the lock key 49 is connected to the terminals Ta and Tb. Therefore, the connection detection circuit 16 detects a "LOW" signal because the terminal Tb is grounded.

In other words, the "HIGH" signal and the "LOW" signal, which are detection signals according to the attach/detach state of the battery unit 40 (corresponding to the slide of the lock key 49) relative to the main body 11, are inputted into the connection detection circuit 16. Therefore, the connection detection circuit 16 detects, based on the detection signal, the attach/detach state of the battery unit 40 relative to the main body 11.

(Operation of the Present Embodiment)

Figure 3:
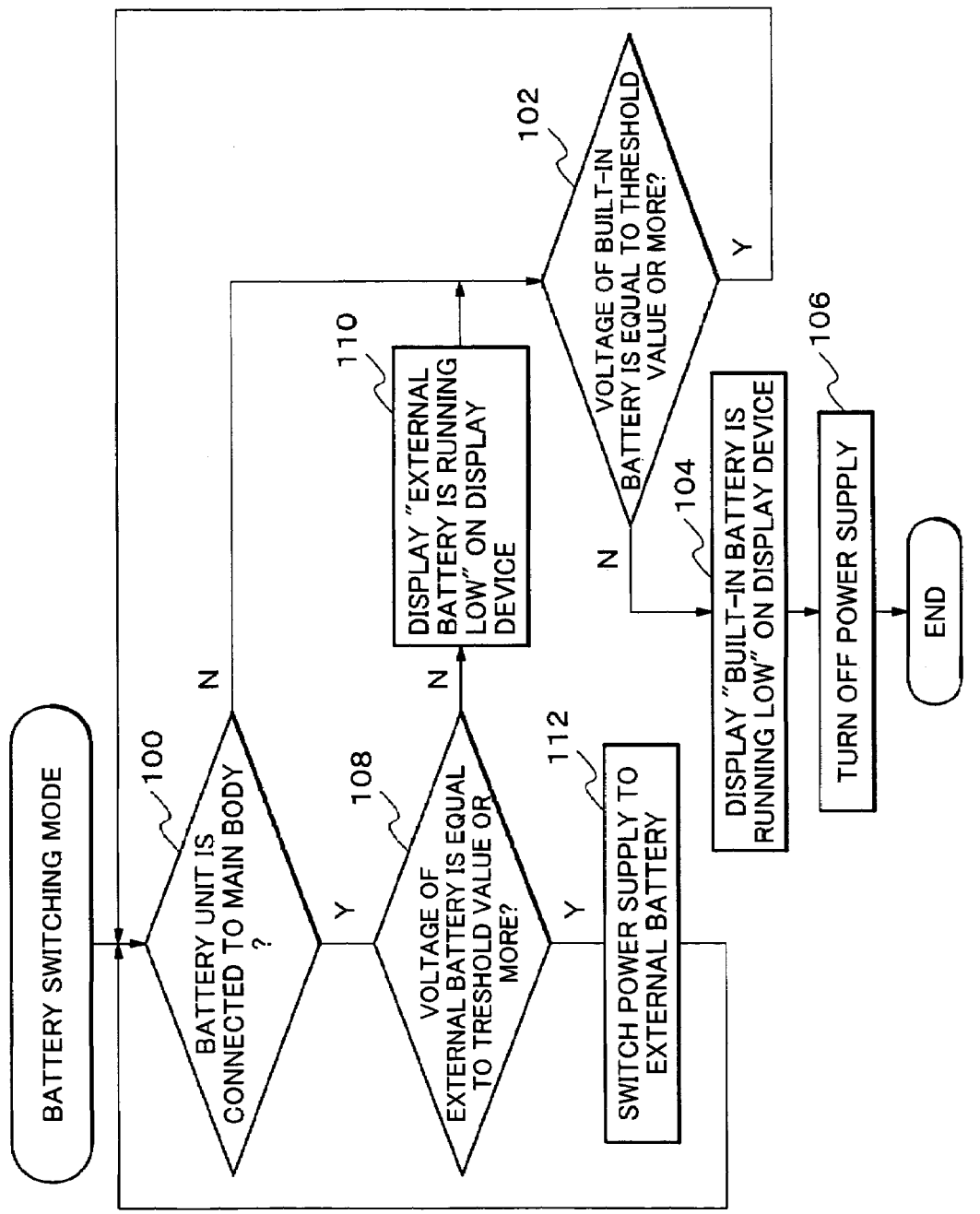
FIG. 3 is a flowchart of a battery switching mode of the power apparatus shown in FIG. 1.

Referring next to FIG. 3, a process with respect to a battery switching mode will be described. FIG. 3 is a flowchart showing a process routine performed by the control circuit 14 of the cellular phone 10. The program regarding this process routine is previously stored in a program area of the storage unit 38.

In addition, the flowchart shown in FIG. 3 is a process to be performed after the power switch (illustration omitted) of the cellular phone 10 is turned on by a user and under the condition that the voltage of the built-in battery 28 shown in FIG. 1 is equal to 3.0(Volts) or more. In other words, the cellular phone 10 is set to be started up (actuated) and initialized, based on the voltage of the built-in battery 28. Therefore, for example, when the voltage of the built-in battery 28 is equal to 3.0(Volts) or less, the flowchart does not start, because no power will be supplied to the central processing unit 12 even when the power switch is turned on.

(Battery Switching Mode)

As shown in FIG. 3, in step 100, the control circuit 14 of the central processing unit 12 shown in FIG. 1 determines, based on the voltage detected by the connection detection circuit 16, whether or not the battery unit 40 is connected to the main body 11 of the cellular phone 10. In other words, when a "LOW" signal (detection signal) is inputted into the connection detection circuit 16, the control circuit 14 determines, as shown in FIG. 2, that the battery unit 40 is attached to the main body 11 (connected state). On the other hand, when a "HIGH" signal (detection signal) is inputted into the connection detection circuit 16, the control circuit 14 determines, as shown in FIG. 1, that the battery unit 40 is detached from the main body 11 (detached state).

When the result of the step 100 is negative, i.e., the battery unit 40 is not connected to the main body 11, the control circuit 14 shown in FIG. 1 determines in step 102, based on the voltage detected by the second detection circuit 18, whether or not the voltage of the built-in battery 28 is equal to a threshold value or more. In other words, the second detection circuit 18 shown in FIG. 1 detects (measures) the voltage of the built-in battery 28. Then, the control circuit 14, which is a determining means, compares the threshold value (for example, 3.4 Volt) stored in the storage unit 38 shown in FIG.

1, with the detected voltage of the built-in battery 28. Here, the threshold value is the voltage at which the power supply is turned off by means of software, by that the remaining level of the built-in battery 28 is running short.

Next, when the result of the step 102 is negative, i.e., the voltage of the built-in battery 28 is equal to 3.4(Volts) or less, the control circuit 14 makes, in step 104, a display device (not-shown) display "Built-in battery is Running Low", for a predetermined period. Subsequently, the control circuit 14, in step 106, ends the flowchart by turning off the power supply. Here, a method of presenting the warning "Built-in battery is Running Low" is not limited to displaying on the display device (not-shown), and sound data may be outputted from a speaker (not-shown) as an alarm warning.

When the result of the step 102 is affirmative, i.e., the voltage of the built-in battery 28 is equal to 3.0(Volts) or more, the process returns to the step 100 and uses the built-in battery 28 as the power supply. In other words, as shown in FIG. 2, the control circuit 14 executes the processes following the step 100 until the battery unit 40 (external battery 44) is connected to the main body 11.

When the result of the step 100 is affirmative, i.e., the battery unit 40 is connected (attached) to the main body 11, the control circuit 14, in step 108, determines whether or not the voltage of the external battery 44 is equal to a threshold value or more. In other words, the third detection circuit 20 shown in FIG. 1, detects (measures) the voltage of the external battery 44. Then, the control circuit 14, which is the determining means, compares the threshold value stored in the storage unit 38 shown in FIG. 1 (for example, 3.4 Volt) with the voltage of the detected external battery 44.

Then, when the result of the step 108 is negative, i.e., the voltage of the external battery 44 is equal to 3.4(Volts) or less, the control circuit 14 makes, in step 110, a display device (not-shown) display "Built-in battery is Running Low", for a predetermined period. Subsequently, the control circuit 14 proceeds to the step 102 and executes the processes following the step 102.

When the result of the step 108 is affirmative, i.e., the voltage of the external battery 44 is equal to 3.4(Volts) or more, the control circuit 14, in step 112, switches the change-over switch 30. In other words, the control circuit 14 switches the battery to be used as the power supply from the built-in battery 28 to the external battery 44, by outputting a control signal to the change-over switch 30. Then, after processing the step 112, the process returns to the step 100 and executes the steps which follow the step 100. For example, as shown in, FIG. 1, the external battery 44 is used as the power supply until the level of the external battery 44 falls below the threshold value. In addition, until the battery unit 40 (external battery 44) is detached from the main body 11, the external battery 44 is employed as the power supply.

In the present embodiment, because the second detecting means 18 and the third detecting means 20 detect the voltages of the built-in battery 28 and the external battery 44 respectively, the control circuit 14, which is the determining means, switches, during the use of the cellular phone 10, the battery to be used as the power supply, based on the detection result according to the above-mentioned battery voltage. In other words, according to the present embodiment, because both the external battery 44 and the built-in battery 28 can be used up until the remaining battery level runs out, the cellular phone 10 is usable over a long time period. In addition, small capacity batteries, i.e. those having smaller volumes are available as the built-in battery 28, thereby miniaturization or slimming of the cellular phone can be realized, as well as design flexibility in terms of appearance can be enhanced.

Next, an approach using the AC adapter 60 to charge the built-in battery 28 or the external battery 44 will be explained. Here, the charge process is executed during any process of FIG. 3. In other words, the charge process allows to freely charge the cellular phone 10 even during operation (during calls).

There are charging methods 1 to 3 as methods of charging. The charging method 1 is an approach such as connecting the AC adapter 60 directly to the cellular phone 10 and charging the built-in battery 28 of the cellular phone 10. The charging method 2 is an approach such as connecting the AC adapter 60 to the battery unit 40 and charging the external battery 44 of the battery unit 40. Here, in the charging method 2, the battery unit 40 is not attached to the main body 11. The charging method 3 is an approach such as connecting the AC adapter 60 to the battery unit 40, as well as attaching the battery unit 40 to the cellular phone 10, and charging the built-in battery 28 of the cellular phone 10 and the external battery 44 of the battery unit 40.

The charging method 1 connects the connecting terminal 62 of the AC adapter 60 directly to the connecting terminal 32 of the cellular phone 10 and charges the built-in battery 28 of the cellular phone 10. The charging power from the AC adapter 60 is controlled by both the central processing unit 12 and the first charging circuit 26. When the cellular phone is operating, the first charging circuit 26 supplies power to the power supply circuit 24 of the cellular phone 10, and supplies charging power to the built-in battery 28. When the cellular phone 10 is idle (power-off), only the built-in battery 28 is charged. When the charging is finished, a character string "charge completed" is displayed on the display device not shown. On the other hand, when the cellular phone 10 is operating, no power will be supplied from the first charging circuit 26 to the power supply circuit 24, but power will be supplied from the built-in battery 28 to the power supply circuit 24.

The charging method 2 connects the connecting terminal 62 of the AC adapter 60 to the connecting terminal 46 of the battery unit 40 and charges the external battery 44 of the battery unit 40. The charging power from the AC adapter 60 is controlled by the second charging circuit 42. The second charging circuit 42 detects that there is no power supply to the cellular phone 10 and the charging power from the AC adapter 60. Then, the second charging circuit 42 charges the external battery 44 by supplying the charging power to the external battery 44.

The charging method 3 connects the connecting terminal 62 of the AC adapter 60 to the connecting terminal 46 of the battery unit 40, and also connects the connecting terminal 48 of the battery unit 40 to the connecting terminal 32 of the cellular phone 10. In other words, the above-mentioned connection state is a state where the battery unit 40 is attached to the main body 11. The charging current from the AC adapter 60 is supplied to the battery unit 40 and the cellular phone 10. The charging method 3 preferentially charges the built-in battery 28 of the cellular phone 10. The charging power from the AC adapter 60 is first supplied to the first charging circuit 26 of the cellular phone 10 and charges the built-in battery 28 as with the charging method 1. When charging of the built-in battery 28 is completed, charging of the external battery 44 starts.

When the second charging circuit 42 detects that there is no power supply to the cellular phone 10, the battery unit 40 supplies charging power to the external battery 44 to be charged. When the cellular phone 10 is using the external battery 44 as the power supply, a portion of the charging power is supplied to the power supply circuit 24 of the cellular phone 10. When charging of the external battery 44 is completed, a character string "charge completed" is displayed on the display device not shown.

In the present embodiment, the cellular phone 10 can be used over a long time period, because the control circuit 14, the battery switching circuit 22 and the first charging circuit 26, etc. switch or charge the external battery 44 and the built-in battery 28, even during operation of the cellular phone 10 such as during calls.

Figure 4:
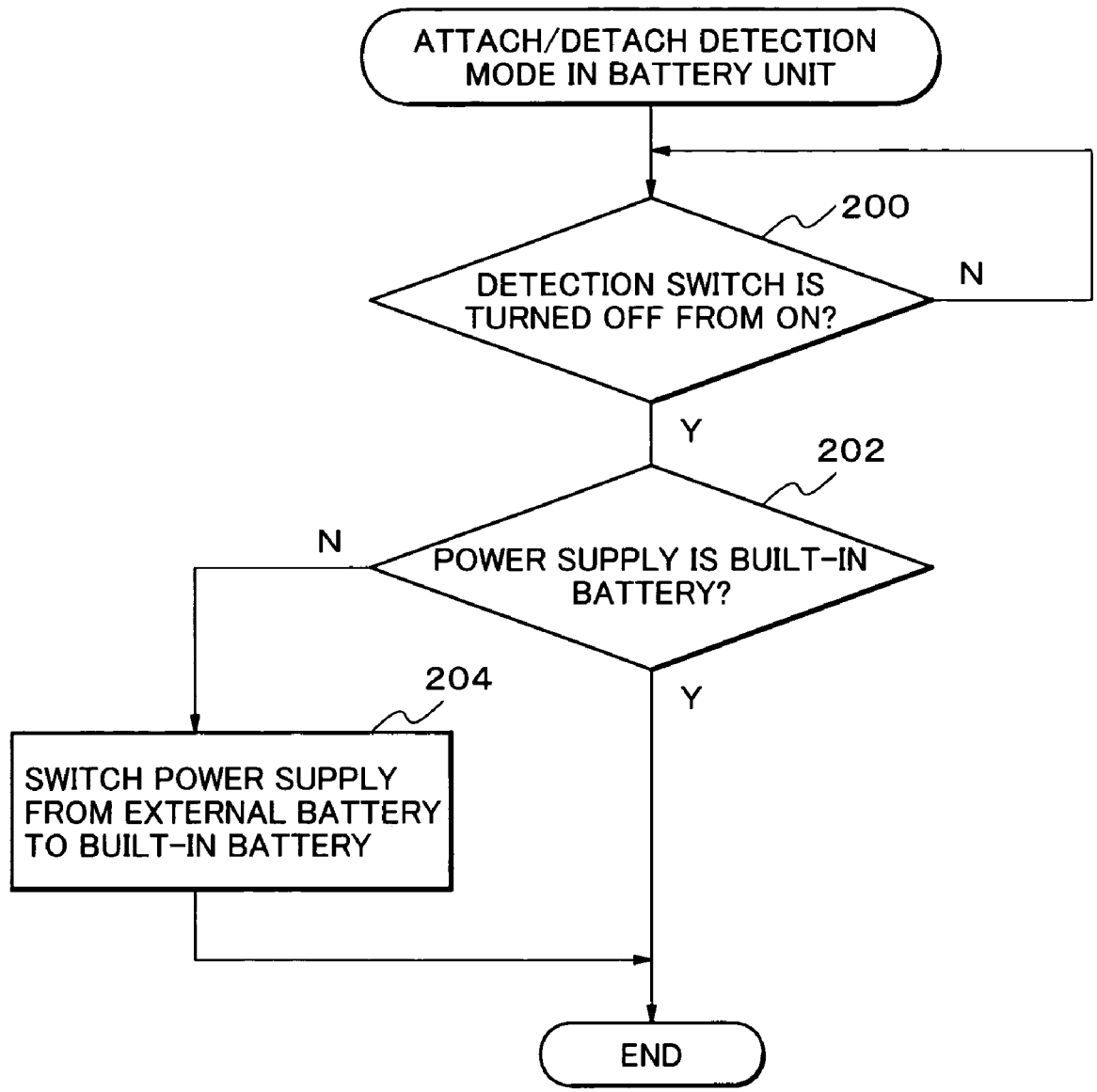
FIG. 4 is a flowchart of an attach/detach detection mode in the battery unit shown in FIG. 1.

Next, referring to FIG. 4, a process relating to a connection detecting mode in the battery unit will be described. FIG. 4 is a flowchart showing a process routine performed by the control circuit 14 of the cellular phone 10. The program concerning the process routine is previously stored in a program area of the storage unit 38. In addition, the flowchart shown in FIG. 4 is a process to be executed in a state where the cellular phone 10 is processing calls, etc., and the external battery 44 or the built-in battery 28 is being used as the power supply (a state where the battery unit 40 is attached as shown in FIG. 2).

(Connection Detecting Mode in the Battery Unit)

Figure 2:
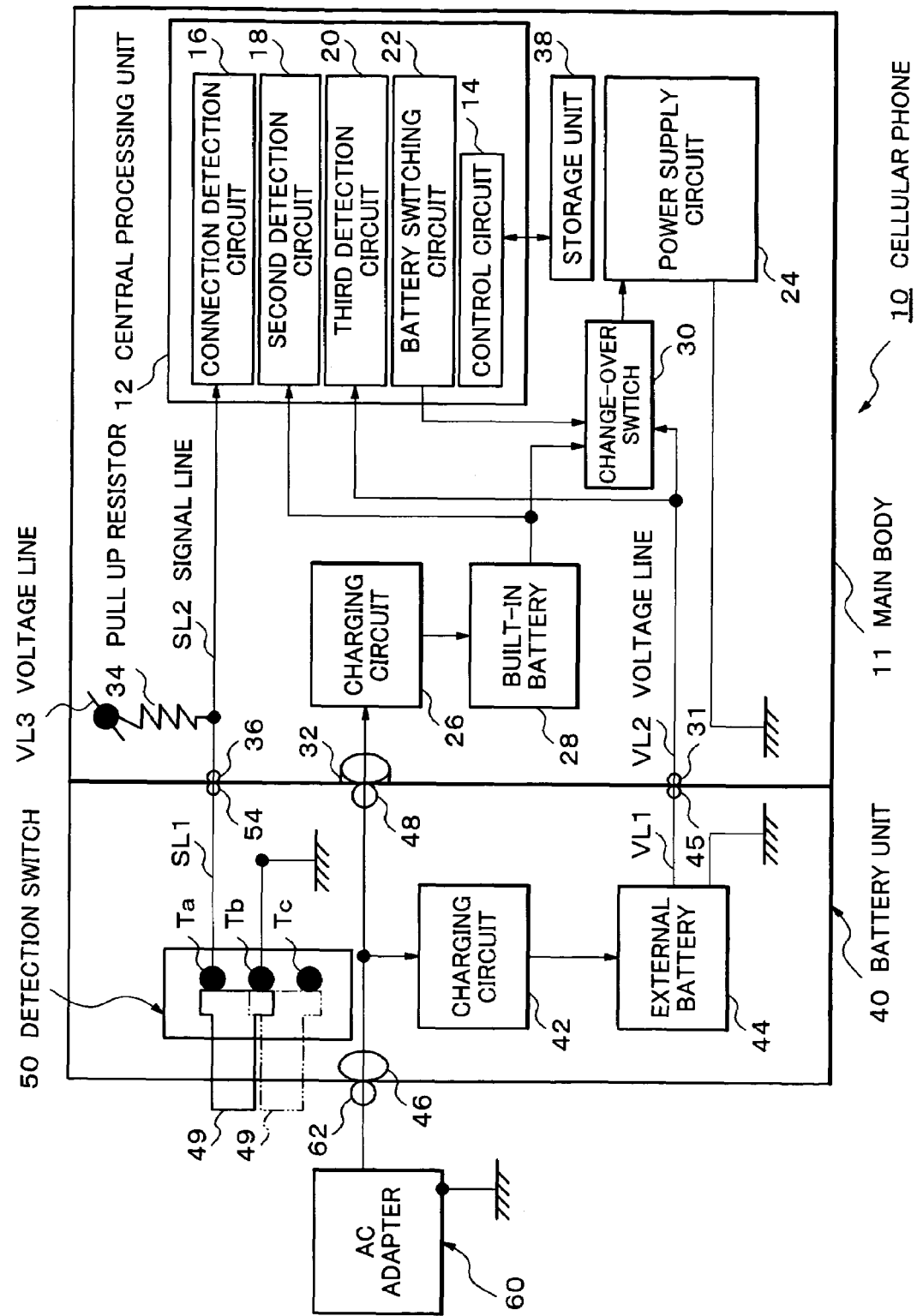
FIG. 2 is a conceptual diagram of attaching a battery unit shown in FIG. 1 to the main body of a cellular phone.

As shown in FIG. 4, in step 200, the control circuit 14 of the central processing unit 12 shown in FIG. 2, determines whether or not the detection switch 50 has switched from "ON" to "OFF". For example, when the user, etc. slides the lock key 49 (see FIG. 2) from a position indicated by the solid line to a position indicated by the chain double-dashed line, the detection switch 50 switches, in conjunction with the lock key 49, from "ON" to "OFF".

When the detection switch 50 switches from "ON" to "OFF", the detection signal to be inputted to the connection detection circuit 16 switches from a "LOW" signal to a "HIGH" signal. Therefore the control circuit 14 determines that the battery unit 40 is in a preliminary stage, being detached from the main body 11, as shown in FIG. 1.

The step 200 waits until the detection switch 50 switches from "ON" to "OFF". On the other hand, when the result of the step 200 is affirmative, i.e., the detection switch 50 does not switch from "ON" to "OFF", the control circuit 14 shown in FIG. 2 determines, in step 202, whether or not the power supply of the cellular phone 10 is the built-in battery 28. In other words, the control circuit 14 reads out, from the storage unit 38, and determines the switching direction of the current change-over switch 30.

When the result of the step 202 is affirmative, i.e., the power supply of the cellular phone 10 is the built-in battery 28, the flowchart ends. On the other hand, when the result of the step 202 is negative, i.e., the power supply of the cellular phone 10 is the external battery 44, the control circuit 14 switches, in step 204, the battery to be used as the power supply from the built-in battery 28 to the external battery 44. In other words, the control circuit 14 switches the change-over switch 30 by outputting a control signal to the change-over switch 30. The flowchart ends when the battery to be used as the power supply switches from the built-in battery 28 to the external battery 44.

Then, with the present embodiment, since the built-in battery 28 becomes the power supply of the cellular phone 10 in the detaching-state where the lock key 49 is unlocked, the power supply in the cellular phone 10 is not interrupted, and the calls, etc. are continued, also in the subsequent detached stage (the stage wherein the battery unit 40 is detached from the main body 11).

In other words, the present embodiment, performs an operation to detach the battery unit 40 from the main body 11 of the cellular phone 10, such as unlocking the lock key 49, in a state where the cellular phone 10 is processing a call (the cellular phone 10 being occupied) and using the external battery 44 as the power supply (a state where the battery unit 40 is attached as shown in FIG. 2). When the lock key 49 is unlocked, the connection detection circuit 16 determines, based on the voltage detected by the connection detection circuit 16, that the battery unit 40 is in a detaching-state prior to complete detachment from the main body 11, because a "HIGH" signal (detection signal) is inputted to the connection detection circuit 16 before power supply from the external battery 44 stops.

Therefore, the control circuit 14 switches, via the battery switching circuit 22, the power supply from the external battery 44 to the built-in battery 28. In other words, according to the present embodiment, because the switching process of the power supply takes place in the above-mentioned detaching-state after unlocking the lock key 49, the power supply to the cellular phone 10 is not interrupted, thereby preserving the power-on state, and continuing the call.

The connection detecting means in the battery unit 40 shown in FIG. 1 provides an example wherein the power supply of the cellular phone 10 is set to the built-in battery 28 before actually detaching the battery unit 40 from the main body 11 (previously), by operating the lock key 49 in a preliminary stage before detaching the battery unit 40 from the main body 11.

Figure 5:
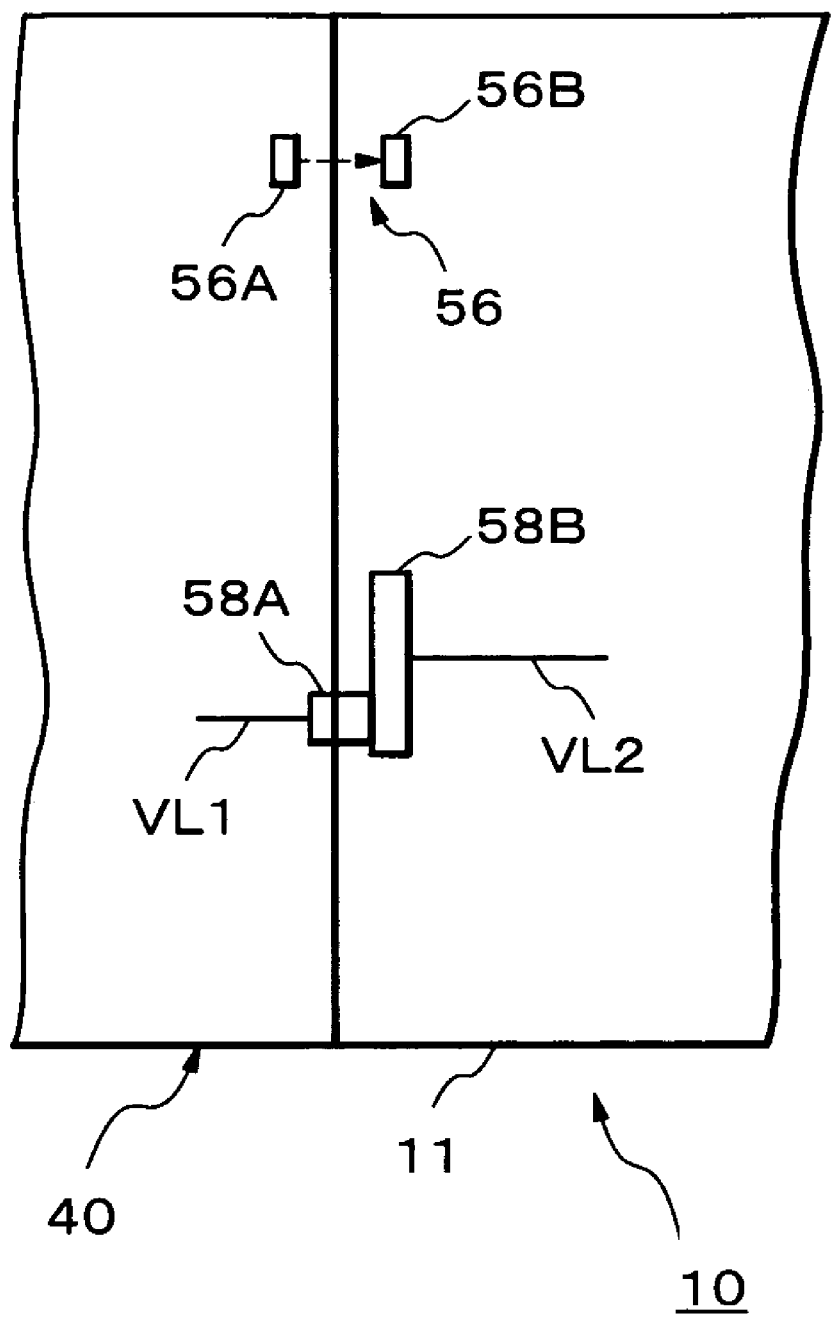
FIG. 5 is a conceptual diagram with regard to another modified example of a connection detecting means shown in FIG. 1.

Next, a modified example of the connection detecting means in the battery unit 40 is shown in FIG. 5. A sensor 56, constituting a part of the connection detecting means, comprises a light emitter 56A and a light receiving element 56B. As shown in FIG. 5, the light emitter 56A is disposed on the side of the battery unit 40. On the other hand, the light receiving element 56B, disposed on the side of the main body 11, is connected to the connection detection circuit 16 shown in FIG. 1. In addition, detaching of the battery unit 40 from the main body 11 is exemplified as sliding the battery unit 40 relative to the main body 11, followed by moving it to a direction perpendicular to the above-mentioned slide direction.

In a state where the battery unit 40 is attached to the main body 11, the battery unit 40 is arranged so that the light emitted from the light emitter 56A is received by the light receiving element 56B, as shown in FIG. 5. When the light emitted from the light emitter 56A is received by the light receiving element 56B, the light receiving element 56B outputs a detection signal to the connection detection circuit 16 (see FIG. 1). Therefore, the connection detection circuit 16 detects that the battery unit 40 has been attached to the main body 11.

Furthermore, in the state where the battery unit 40 has been attached to the main body 11, connecting terminals 58A and 58B to be connected to the voltage lines VL1 and VL2 are connected. Here, in the state shown in FIG. 5, the connecting terminal 58A is connected in such a manner that it is located at one end of the connecting terminal 58B. Therefore, power from the external battery 44 shown in FIG. 1 is supplied to the power supply circuit 24 via the change-over switch 30.

Figure 6:
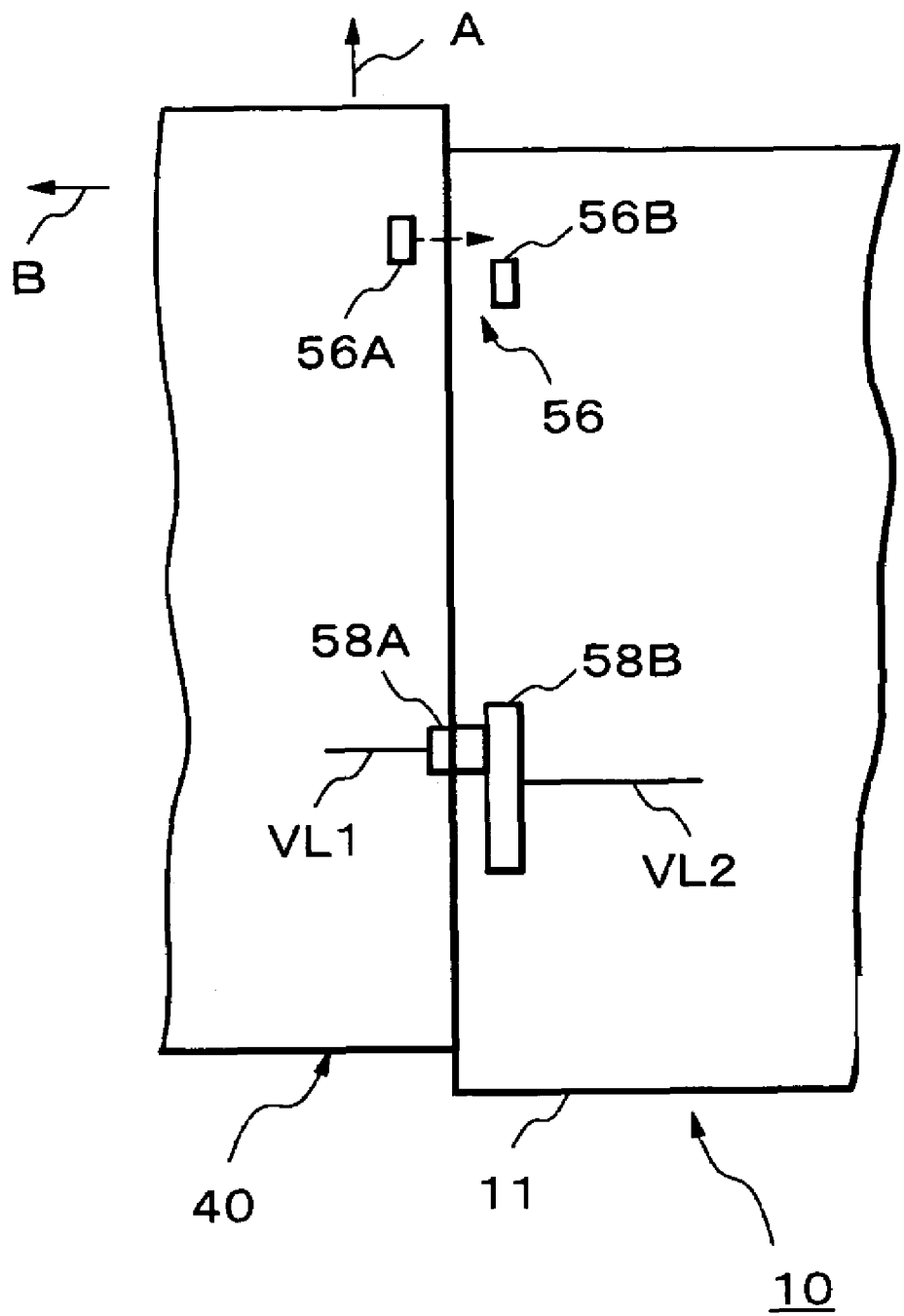
FIG. 6 is diagram illustrating the status of connection detection when the battery unit shown in FIG. 5 slides.

On the other hand, for example, sliding the battery unit 40 to a direction indicated by the arrow A, relative to the main body 11, the battery unit 40 is detached from the main body 11, as shown in FIG. 6. Then, the light emitted from the light emitter 56A is not received by the light receiving element 56B, because the light emitter 56A and the light receiving element 56B do not face each other in the detaching-state prior to complete detachment of the battery unit 40 from the main body 11 (the state shown in FIG. 6). Therefore, the connection detection circuit 16 shown in FIG. 1 detects that the battery unit 40 is in a preliminary stage before being detached from the main body 11.

In addition, the connecting terminals 58A and 58B to be connected to voltage lines VL1 and VL2 are connected also in the transition state before the battery unit 40 is detached from the main body 11. In the state shown in FIG. 6, the connecting terminal 58A is connected in such a manner that it is located at the other end of the connecting terminal 58B. Therefore, the power from the external battery 44 shown in FIG. 1 is supplied to the power supply circuit 24 via change-over switch 30.

In other words, the connecting terminals 58A and 58B are arranged such that the voltage lines VL1 and VL2 of the external battery 44 are kept connected to the power supply circuit 24 (see FIG. 1) of the main body 11, over the transition stage before the detachment of the battery unit 40 from the main body 11. Then, in the transition stage (the stage shown in FIG. 6) of the battery unit 40, the control circuit 14 shown in FIG. 1, switches the power supply of the cellular phone 10 (electronic equipment 10) from the external battery 44 to the built-in battery 28 via the battery switching circuit 22.

Detaching the battery unit 40 from the main body 11 is performed by sliding the battery unit 40 to the direction indicated by the arrow A, and subsequently moving it to a perpendicular direction (direction of the arrow B) relative to the slide direction (direction of the arrow A). Therefore, sliding the battery unit 40 to the direction of the arrow A corresponds to the above-mentioned pre-detach stage (detach state). Then, the subsequent movement of the battery unit 40 to the direction of the arrow B is the actual operation of detaching the battery unit 40 from the main body 11.

The modified example shown in FIG. 5 eliminates the necessity of operating the lock key 49, etc. shown in FIG. 1, thereby improving ease of use. Since the other arrangement and operational effect are similar to the embodiment shown in FIG. 1, its detailed description is omitted. Here, the process of the connection detecting mode in the battery unit is also similar to that in FIG. 4. That is to say, in the step 200, an identical process is executed except that ON/OFF of the detection switch 50 (see FIG. 1) becomes the detection signal (an ON signal or an OFF signal) of the light receiving element 56B.

Here, in the modified example shown in FIG. 5, the arrangement, etc. of the sensor 56 and the connecting terminal 58 can be arbitrarily changed, and, the operation of detaching the battery unit 40 from the main body 11 may be arranged so as to slide the battery unit 40 to only one direction. In addition, the process flow of each program (see FIGS. 3 and 4) explained in the above-mentioned embodiment is by way of an example, and may be changed accordingly within the range not departing from the scope of the present invention. For example, in the flowchart shown in FIG. 3, the process shown in FIG. 3 may be started by the power from the external battery 44 even if the voltage of the built-in battery 28 is equal to a threshold value, 3.0 (Volts) or less, provided that the voltage of the external battery 44 is equal to the threshold value or more, in a state where the external battery 44 is connected.

Furthermore, the pattern to be combined in the present invention may be, for example, a pattern combining two examples, or two or more examples among the above-mentioned embodiment or modified example. For example, the built-in battery 28 or the external battery 44 need not necessarily be a chargeable secondary battery, but a primary battery may also be applicable.

In addition, the cellular phone 10 of the present embodiment is an apparatus that comprises the built-in battery 28, which is a chargeable first battery; the main body 11 of the cellular phone 10 for disposing the built-in battery 28; the battery unit 40 detachably disposed to the main body 11; the external battery 44, which is a second battery disposed in the battery unit 40; the first detecting means (connection detection circuit 16) for detecting, before the power supply of the cellular phone 10 turns off, the detaching status before the battery unit 40 is completely detached from the main body 11; and the control means (control circuit 14) for controlling the switching of the power supply of the cellular phone 10 from the external battery 44 to the built-in battery 28, when the connection detection circuit 16 detects a detaching-state in the battery unit 40 and the main body 11.

In addition, the power apparatus of the present embodiment is an apparatus that comprises the built-in battery 28, which is a first battery to be disposed in the main body 11 of the cellular phone 10; the battery unit 40 detachably disposed in the main body 11; the external battery 44, which is a second battery disposed in the battery unit 40; the first detecting means (connection detection circuit 16) for detecting, before the power supply of the cellular phone 10 turns off, the detaching status before the battery unit 40 is completely detached from the main body 11; and the control means (control circuit 14) for controlling the switching of the power supply of the cellular phone 10 from the external battery 44 to the built-in battery 28, when the connection detection circuit 16 detects a detaching-state in the battery unit 40 and the main body 11.

In the present embodiment, the above-mentioned power apparatus is arranged to be incorporated in the cellular phone 10. In the present invention, the above-mentioned power apparatus may also be arranged to be incorporated in electronic equipments, such as personal computers, and personal digital assistants (PDAs). In other words, the electronic equipments according to the present invention encompass, for example, the computers, and the PDAs.

What is claimed is:

1. A power apparatus comprising:
   a first battery disposed in a main body of an electronic equipment;
   a battery unit detachably connected to said main body;
   a second battery disposed in said battery unit;
   first detecting means for detecting, before a power supply of said electronic equipment turns off, a detaching-state prior to complete detachment of said battery unit from said main body; and
   control means for switch-controlling, when said first detecting means detects said detaching-state in said battery unit and said main body, the power supply of said electronic equipment from said second battery to said first battery,
   said first detecting means comprising:
   a light emitter disposed on a side of said battery unit that faces said main body when said battery unit is connected to said main body; and
   a light receiving element disposed on a side of said main body that faces said battery unit when said main body is connected to said battery unit,
   wherein, said detaching-state is detected when light output from said light emitter that was previously received by said light receiving element is no longer being received by said light receiving unit.

2. The power apparatus according to claim 1, further comprising:
   change-over switching means for switching the power supply of said electronic equipment to said first battery or said second battery,
   wherein said change-over switching means switches the power supply of said electronic equipment from said second battery to said first battery, when said control means determines, based on the detection result of said detecting means, that said battery unit and said main body are in the detaching-state.

3. The power apparatus according to claim 2 further comprising:
   locking means for locking said battery unit to said main body and unlocking said battery unit from said main body; and
   a detection switch for moving in conjunction with the unlocking of said locking means and outputting a detection signal to said first detecting means,
   wherein said change-over switching means switches the power supply of said electronic equipment from said second battery to said first battery, when said control means determines, based on the detection signal of said detection switch, that said locking means of said battery unit to said main body is unlocked.

4. The power apparatus according to claim 3,
   wherein a pull up resistor is connected between a signal line in said main body, and a voltage line of the power supply circuit in said main body.

5. The power apparatus according to claim 2, said first detecting means further comprising:
   a connecting terminal by which the voltage line of said second battery is kept connected to the power supply circuit of said main body over a transition stage before detachment of said battery unit from said main body, wherein
   said change-over switching means switches, in the transition stage of said battery unit, the power supply of said electronic equipment from said second battery to said first battery.

6. The power apparatus according to claim 2 further comprising:
   second detecting means for detecting the voltage of said first battery; and
   third detecting means for detecting the voltage of said second battery, wherein
   said control means switches, based on the detection results of said second detecting means and said third detecting means, the power supply of said electronic equipment to said first battery or said second battery, by said change-over switching means.

7. The power apparatus according to claim 6,
   wherein said change-over switching means switches the power supply of said electronic equipment from said first battery to said second battery, when said control means determines that said battery unit is attached to said main body.

8. The power apparatus according to claim 6,
   wherein said change-over switching means switches the power supply of said electronic equipment from said second battery to said first battery, when said control means determines that the voltage of said second battery is equal to a threshold value or less.

9. The power apparatus according to claim 1, wherein said first battery and said second battery are chargeable batteries, wherein said battery unit includes a first charging circuit for charging said first battery, first connecting means for supplying charging power from outside to said first charging circuit, and second connecting means for supplying said charging power to a second charging circuit of said electronic equipment,
   wherein at least one of said first battery and said second battery are charged, when said second connecting means is connected to said second charging circuit and when said charging power is supplied to said first connecting means, and
   wherein, when said first detecting means detects said detaching-state in said battery unit and said main body, said charging power from outside is provided to said first battery to charge said first battery.

10. The power apparatus according to claim 9,
    wherein said first battery is charged prior to said second battery, when said second connecting means is connected to said second charging circuit and when said charging power is supplied to said first connecting means.

11. An electronic equipment comprising:
    a first battery which is a chargeable battery;
    a main body for disposing said first battery;
    a battery unit detachably disposed for said main body;
    a second battery disposed in said battery unit;
    first detecting means for detecting, before the power supply of said electronic equipment turns off, a detaching-state prior to complete detachment of said battery unit from said main body; and
    control means for switch-controlling, when said first detecting means detects said detaching-state in said battery unit and said main body, the power supply of said electronic equipment from said second battery to said first battery,
    said first detecting means comprising:
      a light emitter disposed on a side of said battery unit that faces said main body when said battery unit is connected to said main body; and
      a light receiving element disposed on a side of said main body that faces said battery unit when said main body is connected to said battery unit,
      wherein, said detaching-state is detected when light output from said light emitter that was previously received by said light receiving element is no longer being received by said light receiving unit.

12. The electronic equipment according to claim 11, further comprising:
    change-over switching means for switching the power supply of said electronic equipment to said first battery or said second battery,
    wherein said change-over switching means switches the power supply of said electronic equipment from said second battery to said first battery, when said control means determines, based on the detection result of said first detecting means, that said battery unit and said main body are in the detaching-state.

13. The electronic equipment according to claim 12 further comprising:
    locking means for locking said battery unit to said main body and unlocking said battery unit from said main body; and
    a detection switch for moving in conjunction with the unlocking of said locking means and outputting a detection signal to said first detecting means,
    wherein said change-over switching means switches the power supply of said electronic equipment from said second battery to said first battery, when said control means determines, based on the detection signal of said detection switch, that said locking means of said battery unit to said main body is unlocked.

14. The electronic equipment according to claim 13, wherein a pull up resistor is connected between a signal line in said main body, and a voltage line of the power supply circuit in said main body.

15. The electronic equipment according to claim 12, said first detecting means further comprising:

a connecting terminal by which the voltage line of said second battery is kept connected to the power supply circuit of said main body over a transition stage before detachment of said battery unit from said main body, wherein said change-over switching means switches, in the transition stage of said battery unit, the power supply of said electronic equipment from said second battery to said first battery.

16. The electronic equipment according to claim 12 further comprising:

second detecting means for detecting the voltage of said first battery; and third detecting means for detecting the voltage of said second battery, wherein said control means switches, based on the detection results of said second detecting means and said third detecting means, the power supply of said electronic equipment to said first battery or said second battery, by said change-over switching means.

17. The electronic equipment according to claim 16, wherein said change-over switching means switches the power supply of said electronic equipment from said first battery to said second battery, when said control means determines that said battery unit is attached to said main body.

18. The electronic equipment according to claim 16, wherein said change-over switching means switches the power supply of said electronic equipment from said second battery to said first battery, when said control means determines that the voltage of said second battery is equal to a threshold value or less.

19. The electronic equipment according to claim 11, wherein said second battery is a chargeable battery, wherein said battery unit includes first charging circuit for charging said first battery, first connecting means for supplying charging power from outside to said first charging circuit, and second connecting means for supplying said charging power to a second charging circuit of said electronic equipment, wherein at least one of said first battery and said second battery are charged, when said second connecting means is connected to said second charging circuit and when said charging power is supplied to said first connecting means, and wherein, when said first detecting means detects said detaching-state in said battery unit and said main body, said charging power from outside is provided to said first battery to charge said first battery.

20. The electronic equipment according to claim 19, wherein said first battery is charged prior to said second battery, when said second connecting means is connected to said second charging circuit and when said charging power is supplied to said first connecting means.

* * * * *